(12) United States Patent
Rubin et al.

(10) Patent No.: US 6,937,421 B2
(45) Date of Patent: Aug. 30, 2005

(54) PATTERNED MEDIA HAVING OFFSET TRACKS

(75) Inventors: Kurt Alan Rubin, Santa Clara, CA (US); Bruce David Terris, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 10/042,132

(22) Filed: Jan. 11, 2002

(65) Prior Publication Data

US 2003/0133213 A1 Jul. 17, 2003

(51) Int. Cl.⁷ ................................................. G11B 5/58
(52) U.S. Cl. ................... 360/77.01; 360/77.02; 360/77.03; 360/48; 360/75; 360/76
(58) Field of Search ................ 360/77.01–77.02, 360/77.07, 77.11, 77.12, 77.03, 75–76, 48, 55, 59, 135, 131, 134, 78.04, 81, 77.14, 78.14; 369/13.56, 44.11, 47.1, 44.26, 53.34

(56) References Cited

U.S. PATENT DOCUMENTS

| | | | |
|---|---|---|---|
| 3,665,118 A | * 5/1972 | Cooper, Jr. | 360/21 |
| 4,074,328 A | * 2/1978 | Hardwick | 360/77.06 |
| 4,623,867 A | * 11/1986 | Lundquist et al. | 338/32 R |
| 4,704,711 A | * 11/1987 | Gerard et al. | 369/53.34 |
| 5,055,951 A | * 10/1991 | Behr | 360/77.12 |
| 5,247,398 A | 9/1993 | Sidman | 360/75 |
| 5,276,566 A | * 1/1994 | Clifford, Jr. | 360/64 |
| 5,587,223 A | 12/1996 | White | |
| 5,820,769 A | 10/1998 | Chou | |
| 6,233,206 B1 | * 5/2001 | Hamann et al. | 369/13.01 |
| 6,356,406 B1 | * 3/2002 | Takano et al. | 360/81 |
| 6,421,195 B1 | * 7/2002 | Rubin et al. | 360/48 |
| 6,430,123 B1 | * 8/2002 | Mallary | 369/44.11 |
| 6,500,497 B1 | * 12/2002 | Wang et al. | 427/528 |

OTHER PUBLICATIONS

M. Todorovic et al., Writing and reading of single magnetic domain per bit perpendicular patterned media, Applied Physics Letters, vol. 74, No. 17, Apr. 26, 1999, pp. 2516–2518.

* cited by examiner

*Primary Examiner*—David Hudspeth
*Assistant Examiner*—Natalia Figueroa
(74) *Attorney, Agent, or Firm*—Banner & Witcoff; Joseph P. Curtin (57) ABSTRACT

An information recording system includes a storage medium, such as a magnetic or an optical medium, that is formed to have a plurality of adjacent tracks. Each track includes a plurality of storage elements that are arranged substantially along the track in a regular manner. A head disposed in proximity to the storage medium and has a width that spans at least two adjacent tracks. The storage elements are further arranged substantially along first and second axes, such that the first and second axes are substantially perpendicular to each other and are each substantially oriented 45° from an along-track direction associated with a track. The head reads and/or writes information from at least two adjacent tracks spanned by the head.

24 Claims, 5 Drawing Sheets

PATTERNED MEDIA HAVING OFFSET TRACKS

BACKGROUND OF THE INVENTION

1. Field of the Invention

The present invention relates to information storage techniques. More particularly, the present invention relates to a system for storing information in an information storage medium, such as a magnetic disk drive, a magnetic tape, a magnetic strip, such as on a credit card or a smart card, or an optical disk drive.

2. Description of the Related Art

Figure 1:
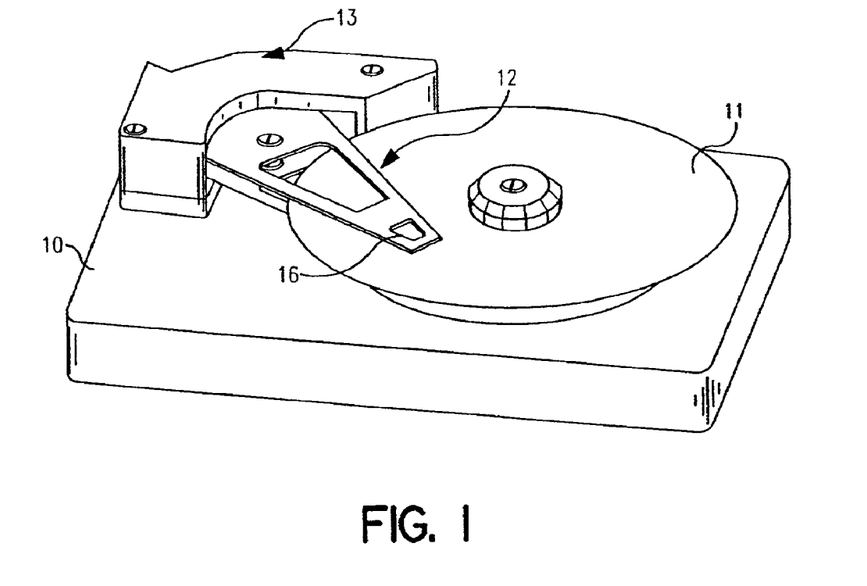
FIG. 1 shows a high RPM disk drive having a two-stage, or piggy-back, servo system for positioning a magnetic read/write head over a selected track on a magnetic disk.
Figure 2:
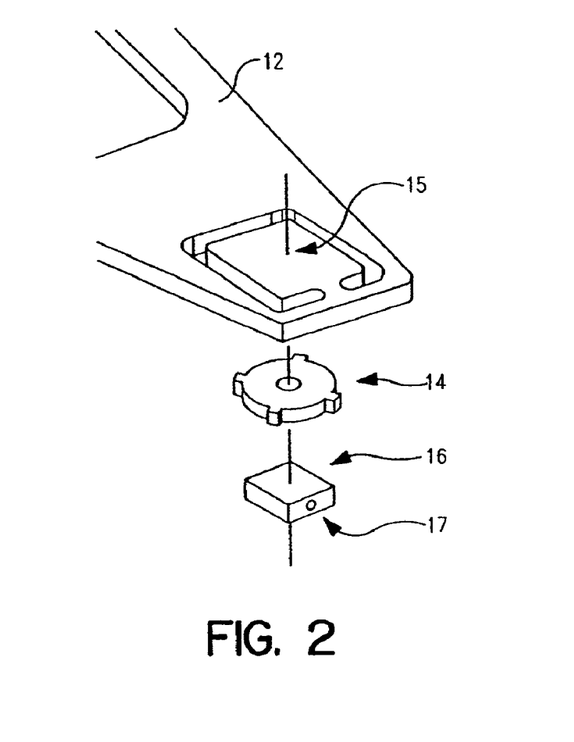
FIG. 2 shows an enlarged exploded view of the read/write head end of suspension.

FIG. 1 shows a high RPM disk drive 10 having a two-stage, or piggy-back, servo system for positioning a magnetic read/write head (or a recording slider) over a selected track on a magnetic disk 11. The two-stage servo system includes a voice-coil motor (VCM) 13 for coarse positioning a read/write head suspension 12 and a microactuator, or micropositioner, for fine positioning the read/write head over the selected track in a well-known manner. FIG. 2 shows an enlarged exploded view of the read/write head end of suspension 12. An electrostatic rotary microactuator 14 is attached to a gimbal structure 15 on suspension 12, and a slider 16 is attached to the microactuator. A read/write head 17 is fabricated as part of slider 16.

Data is stored on magnetic disk 11 by forming magnetic transitions on the surface of magnetic disk 11 using read/write head 17 in a well-known manner. As the storage capacity of a magnetic disk, such as disk 11, increases, the surface area covered by an individual bit must correspondingly decrease. Reducing the size of the area covered by an individual bit has limits. That is, the grains of magnetic material forming the disk are currently approaching a size where the normal thermal fluctuations of magnetization at room temperature is enough to spontaneously change the magnetization of a grain from one magnetic direction to another. This phenomenon is known as the superparamagnetic effect.

Concern over the superparamagnetic effect will likely force a change of technology in order to insure that areal densities of magnetic media can continue to be increased without sacrificing customer data. An approach to overcome the limits caused by the superparamagnetic effect is perpendicular recording, in which the magnetic fields of the grains point substantially out of or into the disk rather than opposite directions across the disk surface. A consequence of perpendicular recording is that it is possible to achieve higher write fields using perpendicular heads, thus enabling recording of media having higher magnetic anisotrophy and greater thermal stability.

Another proposed solution for providing high-density recording is to use patterned media containing a uniform array of bits, with each bit being formed from a single grain of magnetic material instead of hundreds of grains. See, for example, M. Todorovic et al., Writing and reading of single magnetic domain per bit perpendicular patterning media, Applied Physics Letters, Volume 74, Number 17, 26 Apr. 1999, pp. 2516–2518; U.S. Pat. No. 5,587,223 to White; and U.S. Pat. No. 5,820,769 to Chou.

While the bit width of a patterned media can be made very small, the bit length may not be reduced as much as compared to conventional non-patterned media techniques. Consequently, the data rate that is achievable using a patterned media will be adversely impacted in the absence of resorting to much higher media RPM. Moreover, it will be more difficult to fabricate read and write heads to address the narrower tracks provided by patterned media.

What is needed is a technique for optimizing the overall performance of a storage system, particularly with respect to key attributes, such as areal density and data rate, and that takes into account limitations to the current state of the art of minimum resolutions that are achievable using both patterned media and read and write head design.

BRIEF SUMMARY OF THE INVENTION

The present invention provides a technique for optimizing the overall performance of a storage system, particularly with respect to key attributes, such as areal density and data rate. Further, the present invention takes into account limitations to the current state of the art of minimum resolutions that are achievable using both patterned media and read and write head design.

The advantages of the present invention are provided by an information recording system having a storage medium, such as a magnetic storage medium or an optical storage medium, and a head. The storage medium, which can be a patterned storage medium, includes a plurality of adjacent tracks, such that each of the adjacent tracks includes a plurality of storage elements that are arranged substantially along each respective track in substantially a regular manner. The head is disposed in proximity to the storage medium and has a width that substantially spans at least two adjacent tracks for reading and/or writing information to the storage medium. Each track is located substantially in a plane within the storage medium. At least one storage element is a magnetic domain storage element that is substantially perpendicular to the plane in which the track in which the storage element is arranged is substantially located. Alternatively, at least one storage element is a storage element that is substantially parallel to the plane in which the track in which the storage element is substantially located.

According to one embodiment, the storage elements are arranged substantially along first and second axes, such that the first axis are substantially perpendicular to the second axis and so that the first and second axes are each locally substantially 45° from the respective along-track directions of the tracks.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

The present invention provides an information storage system that allows for each head of the system to read and/or write multiple tracks in parallel. That is, adjacent tracks are arranged so that bits in one track are offset from bits in an adjacent track in an "along-track" direction. The term "track", as used herein, means a set of bits that are arranged along a line or an arc. The bits may or may not be touching one another. The shape of each bit may have a variance from one bit to another.

Figure 3:
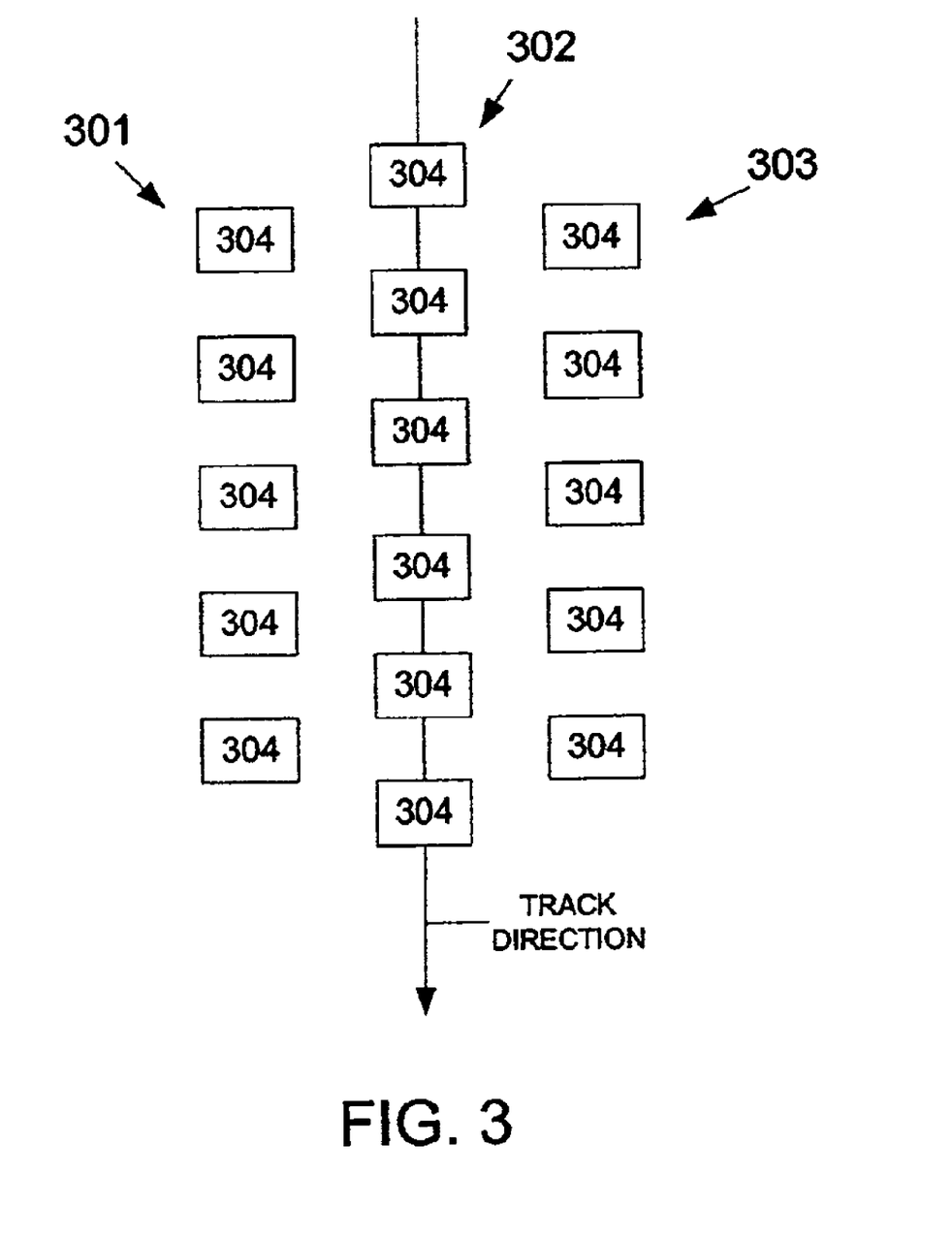
FIG. 3 shows three adjacent tracks having bits that are offset from each other in an "along track" direction according to the present invention.

FIG. 3 shows a plan view of three adjacent tracks 301–303 formed within a storage medium, such as a magnetic storage medium or an optical storage medium. Each track is shown having bits, or storage elements, 304 arranged along the track, i.e., in the "along track" direction. The bits of track 302 produce signals that are phase shifted from the signals produced by the bits of tracks 301 and 303. Consequently, a single head (not shown in FIG. 3) can write and/or read two adjacent tracks simultaneously and the channel would be able to distinguish the respective tracks. The head can also be used to write and/or read only one track at a time, if desired.

Figure 4:
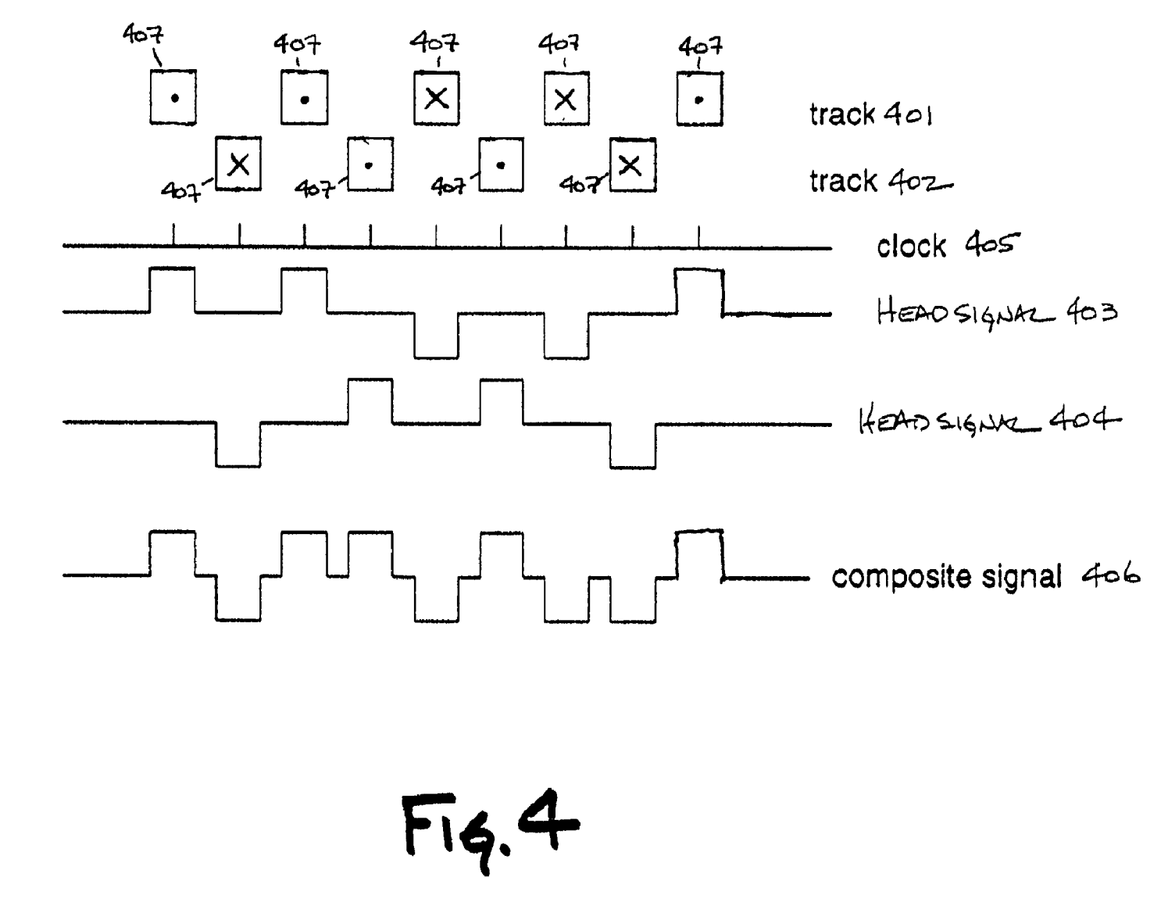
FIG. 4 shows an arrangement of two adjacent tracks and associated head signals according to the present invention.

FIG. 4 shows two adjacent tracks 401 and 402 formed in perpendicular media, such as a perpendicular magnetic media. Tracks 401 and 402 each have a plurality of storage elements 407. An "X" within a storage element 407 indicates that the magnetic field within the element has a direction that is "into" the Figure, while a "●" within a storage element 407 indicates that the magnetic field within the element is "out of" the Figure. Head signals 403 and 404 correspond to tracks 401 and 402, respectively. When the frequency of a clock signal 405 is twice the data frequency of any one track, the data rate from each respective track is at half the clock frequency. For the example shown in FIG. 4, the data of track 401 coincides with odd clock cycles, or ticks, of clock 405, while the data of track 402 coincides with even cycles of clock 405. Consequently, the read signal 406 produced by a "wide" read head, that is, a read head that spans both tracks 401 and 402, can be analyzed to separate the signals of each respective track. Thus, a head having a width that is twice the track pitch can be used for reading and/or writing data. A similar scheme can be used for longitudinal recording.

Moreover, by using a head having a write pole that spans both tracks 401 and 402, each track can be addressed independently using a pulse sequence similar to pulse sequences 403 and 404. When a write pulse in head signal 403 is applied to the head, the pole is positioned above a bit on track 401, and only that bit is written. Likewise, when a write pulse in head signal 404 is applied to the head, the pole is positioned above a bit on track 40, and only that bit is written.

When the "along track" bit spacing is limited by lithography, as is likely to be the case for patterned media, then the data rate will likewise be limited. Consequently, it is not possible to place the bits closer together along a given track. But, by writing or reading two tracks simultaneously, the effective timing between sequentially read bits is reduced, thereby increasing the data rate.

Figure 5:
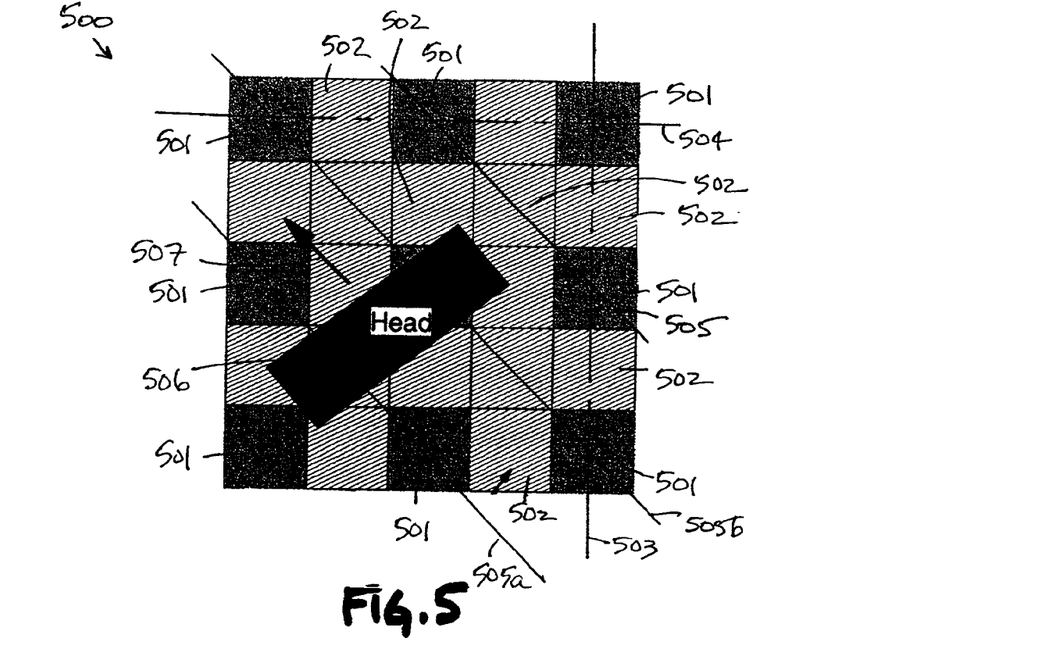
FIG. 5 shows an arrangement of a media pattern and a head according to the present invention.

FIG. 5 shows a media pattern 500 formed in a perpendicular medium, such as a perpendicular magnetic medium or a perpendicular optical medium, that can be generated using, for example, optical interference lithography in a well-known manner. Pattern 500 includes a plurality of storage elements, or regions, 501 and a plurality of non-storage elements, or regions, 502. Storage regions 501 are arranged substantially along axes 503 and 504. Axes 503 and 504 are substantially perpendicular to each other. Storage regions 501 are also arranged to form a plurality of adjacent tracks 505. Each track 505 includes a plurality of storage regions 501 and a plurality of non-storage regions 502 that are arranged substantially along the track in a regular manner. Each storage region 501 in a track is separated from another storage element in the same track by a non-storage region 502. The regular arrangement of storage regions 501 and non-storage regions 502 form a "square" pattern that can be implemented, for example, on a round magnetic medium disk surface or a round optical medium disk surface using a wedge technique, or on a magnetic medium tape or a magnetic strip, such as used on a credit card or a smart card. Further, tracks 505 shown in FIG. 5 can be a plurality of concentric tracks, a plurality of spiral-shaped tracks or a single spiral-shaped track. It should also be understood that while storage elements 501 and non-storage elements 502 are shown as being square and the boundaries of storage elements 501 and non-storage elements 502 are shown as being sharp, it should be understood that there can be local fluctuations in the shape and boundaries of each storage element 501 and each non-storage element 502.

The areal density of pattern 500 can be considered as a "normalized" areal density, defined to be 1X. The data rate for pattern 500 taken along a single track (horizontal or vertical) is also defined to be 1X, and will be referred to herein as the conventional data rate for pattern 500. According to the present invention, the data rate can be increased over the conventional data rate by a factor of approximately 41% without excessive cross-talk between the recorded bits by using a head 506 that moves in a direction 507 along two adjacent tracks, such as tracks 505a and 505b, that is substantially oriented 45° with respect to the general direction of the patterned media.

Figure 6:
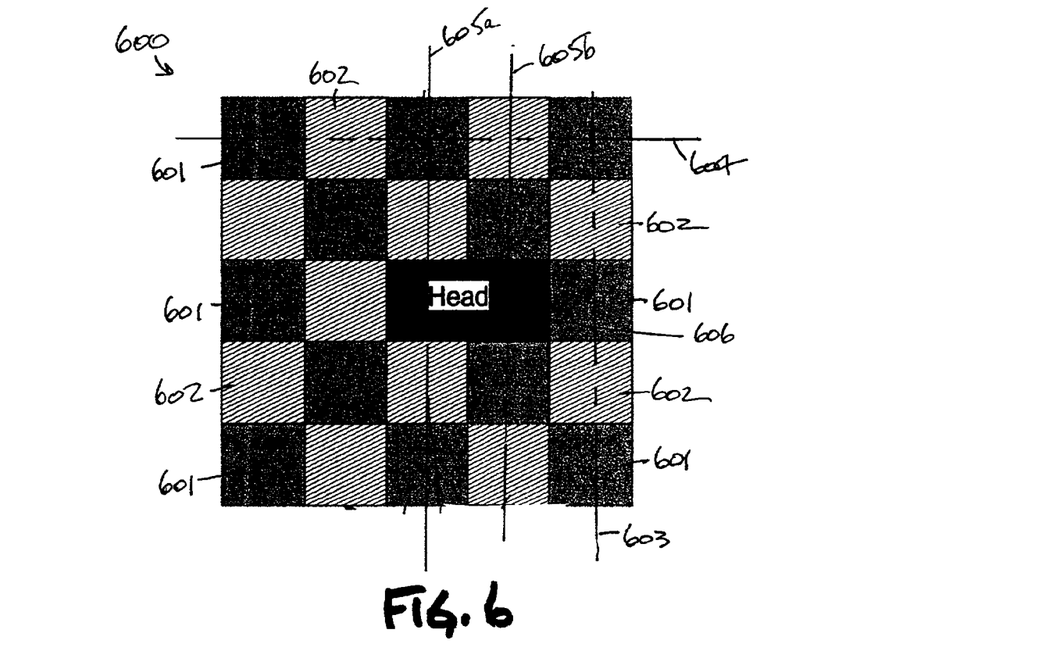
FIG. 6 shows another arrangement of a media pattern and a head according to the present invention.

FIG. 6 shows another media pattern 600 that can be generated using, for example, e-beam lithography in a well-known manner. Pattern 600 includes a plurality of storage regions 601 and a plurality of non-storage regions 602 that are formed in a magnetic medium or an optical medium. Storage regions 601 are arranged substantially along axes 603 and 604. Axes 603 and 604 are substantially perpendicular to each other. Storage regions 601 also form a plurality of adjacent tracks 605. The regular arrangement of storage regions 601 and non-storage regions 602 can be implemented, for example, on a round magnetic medium disk surface or a round optical medium disk surface using a wedge technique, or on a magnetic medium tape or a magnetic strip, such as used on a credit card or a smart card. Further, tracks 605 shown in FIG. 6 can be a plurality of concentric tracks, a plurality of spiral-shaped tracks or a single spiral-shaped track. It should also be understood that while storage elements 601 and non-storage elements 602 are shown as being square and the boundaries of storage elements 601 and non-storage elements 602 are shown as being sharp, it should be understood that there can be local fluctuations in the shape and boundaries of each storage element 601 and each non-storage element 602.

For purposes of illustrating the advantages of the present invention, the resolution limit of the lithographic features is the same as that of patterns generated by optical lithography. By staggering the exposures in a checkerboard manner, however, the areal density of pattern 600 is 2X the areal density of pattern 500 (FIG. 5). The data rate for pattern 600 can also increased by a factor of 2X over the conventional data rate of pattern 500 by positioning a head 606 over two adjacent tracks 605a and 605b so that the bits in the adjacent tracks are alternately detected.

Figure 7:
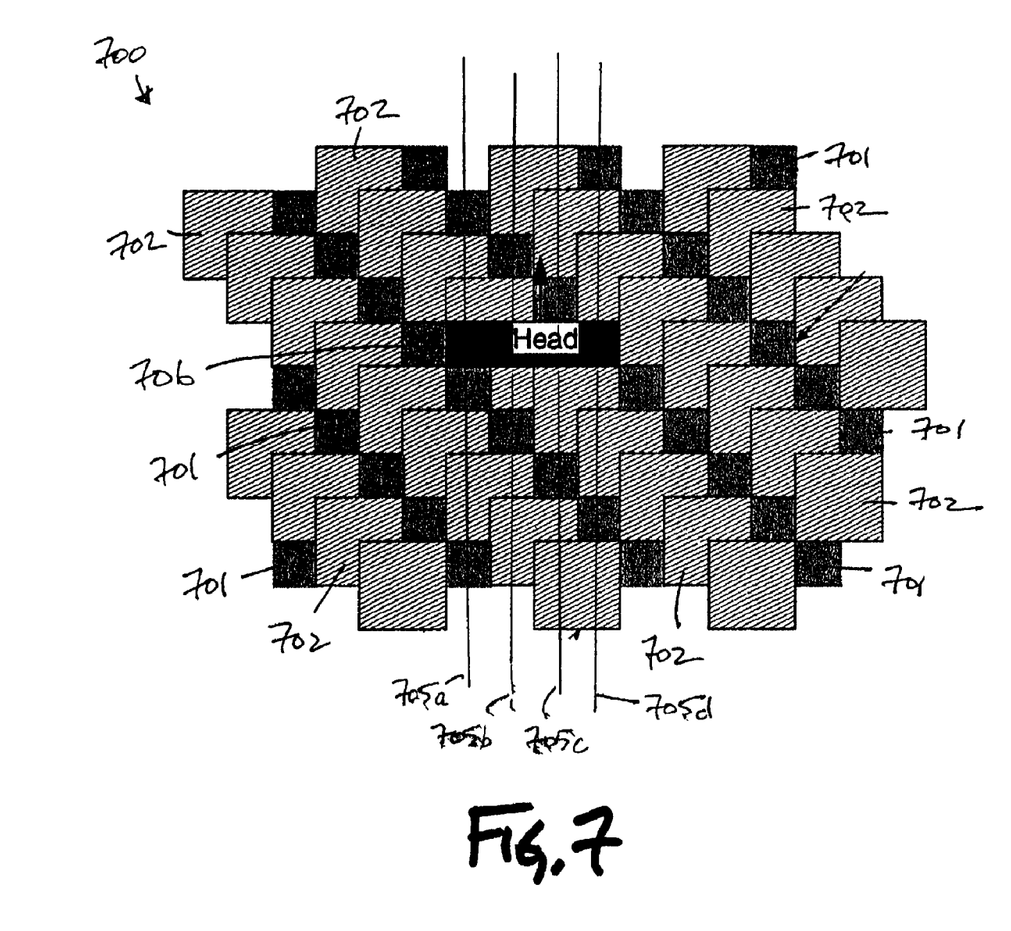
FIG. 7 shows yet another arrangement of a media pattern and a head according to the present invention.

Of course, it is desirable to pack bits as tightly as possible, so a preferable media pattern is that of pattern 600. There may be situations, however, where it is technically difficult to make an ultra narrow head that spans substantially only the width of two adjacent tracks. In such situations, a high data rate is still desired, so the arrangement of patterned media 700, shown in FIG. 7, is advantageous. Pattern 700 can be formed in a well-known manner using e-beam lithography and by staggering the exposures to form storage regions 701 and non-storage regions 702 in a magnetic medium or an optical medium. Storage regions 701 also form a plurality of adjacent tracks 705. The resolution of the lithography system is the same resolution as that used for the patterns of FIGS. 5 and 6. A head 706 is shown spanning four adjacent tracks 705a–705d. Each track 705a–705d spanned by head 706 has a different phase. Accordingly, a relatively more sensitive read head 706 must be used for compensating for the reduced signal produced by the smaller bit size. The regular arrangement of storage regions 701 and non-storage regions 702 can be implemented, for example, on a round magnetic medium disk surface or a round optical medium disk surface using a wedge technique, or on a magnetic medium tape or a magnetic strip, such as used on a credit card or a smart card. Further, tracks 705 shown in FIG. 7 can be a plurality of concentric tracks, a plurality of spiral-shaped tracks or a single spiral-shaped track. It should also be understood that while storage elements 701 and non-storage elements 702 are shown as being square and the boundaries of storage elements 701 and non-storage elements 702 are shown as being sharp, it should be understood that there can be local fluctuations in the shape and boundaries of each storage element 701 and each non-storage element 702.

The areal densities that can be achieved with using the patterns of FIGS. 5–7 are quite dramatic. For example, when the minimum feature size is 50 nm on a side, the conventional optical interference lithography structure (pattern 500 in FIG. 5) yields an areal density of 64 Gbit/in². Patterns 600 and 700 in FIGS. 6 and 7, respectively, would have areal densities of 128 Gbit/in² and 256 Gbit/in², respectively.

As lithographic resolutions improve (i.e., become smaller), the areal densities provided by the present invention will increase accordingly. Another advantage provided by the present invention is that a relatively wider head can be used without a corresponding loss in areal density. For example, when each track is addressed independently, as is done conventionally, the track pitch must be at least wide as the head width. In the situation that two adjacent tracks are being addressed using a single head, the track pitch can be one half the head width, thereby providing a significant increase in areal densities in a situation in which the width of a head limits track density. Of course, any number of tracks can be spanned by the width of the head, as exemplified by FIG. 7.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An information recording system, comprising:
    a storage medium having a plurality of adjacent tracks, each of the adjacent tracks including a plurality of storage elements that are arranged substantially along each respective track in substantially a regular manner, each track having an associated along-track direction, the storage elements being arranged substantially along first and second axes, the first axis being substantially perpendicular to the second axis, the first and second axes being each locally substantially 45° from the respective along-track directions of the tracks; and
    a head disposed in proximity to the storage medium and having a width that substantially spans at least two adjacent tracks, and
    each adjacent track spanned by the head having a different phase.

2. The information recording system according to claim 1, wherein the storage medium is a magnetic storage medium, and the head is a magnetic head.

3. The information recording system according to claim 2, wherein each track is located substantially in a plane within the storage medium, and
    wherein at least one storage element is a magnetic domain storage element that is substantially perpendicular to the plane in which the track in which the storage element is arranged is substantially located.

4. The information recording system according to claim 2, wherein each track is located substantially in a plane within the storage medium, and
    wherein at least one storage element is a magnetic domain storage element that is substantially parallel to the plane in which the track in which the storage element is substantially located.

5. The information recording system according to claim 2, wherein at least a portion of the magnetic storage medium is patterned.

6. The information recording system according to claim 2, wherein the magnetic storage medium is a perpendicular magnetic storage medium.

7. The information recording system according to claim 2, wherein the along-track direction of the tracks is a circle.

8. The information recording system according to claim 2, wherein the along-track direction of the tracks is a spiral.

9. The information recording system according to claim 2, wherein the magnetic storage medium has an areal density of at least about 64 Gbit/in².

10. The information recording system according to claim 2, wherein the magnetic storage medium has an areal density of at least about 128 Gbit/in².

11. The information recording system according to claim 2, wherein the magnetic storage medium has an areal density of at least about 256 Gbit/in².

12. The information recording system according to claim 2, wherein the magnetic storage medium is a magnetic disk.

13. The information recording system according to claim 2, wherein the magnetic storage medium is a magnetic tape.

14. The information recording system according to claim 2, wherein the magnetic storage medium is a magnetic strip.

15. The information recording system according to claim 2, wherein the information recording system is part of a magnetic medium disk drive.

16. The information recording system according to claim 1, wherein the head reads information from at least two adjacent tracks spanned by the head.

17. The information recording system according to claim 1, wherein the head writes information to at least two adjacent tracks spanned by the head.

18. The information recording system according to claim 1, wherein the plurality of adjacent tracks is formed by a plurality of concentric tracks.

19. An information recording system, comprising:
    an optical storage medium having a plurality of adjacent tracks, each of the adjacent tracks including a plurality of storage elements that are arranged substantially along each respective track in substantially a regular manner, each track having an associated along-track direction, the storage elements being arranged substantially along first and second axes, the first axis being substantially perpendicular to the second axis, the first and second axes being each locally substantially 45° from the respective along-track directions of the tracks; and an optical head disposed in proximity to the storage medium and having a width that substantially spans at least two adjacent tracks, and each adjacent track spanned by the head having a different phase.

20. The information recording system according to claim 19, wherein at least a portion of the optical storage medium is patterned.

21. The information recording system according to claim 19, wherein the along-track direction of the tracks is a circle.

22. The information recording system according to claim 19, wherein the along-track direction of the tracks is a spiral.

23. An information recording system, comprising:

a storage medium having a plurality of adjacent tracks, the plurality of adjacent tracks being formed by at least one spiral-shaped track, each of the adjacent tracks including a plurality of storage elements that are arranged substantially along each respective track in substantially a regular manner, each track having an association along-track direction, the storage elements being arranged substantially along first and second axes, the first axis being substantially perpendicular to the second axis, the first and second axes being each locally substantially 45° from the respective along-track directions of the tracks; and a head disposed in proximity to the storage medium and having a width that substantially spans at least two adjacent tracks.

24. An information recording system, comprising:

an optical storage medium having a plurality of adjacent tracks, the plurality of adjacent tracks being formed by at least one spiral-shaped track, each of the adjacent tracks including a plurality of storage elements that are arranged substantially along each respective track in substantially a regular manner, each track having an association along-track direction, the storage elements being arranged substantially along first and second axes, the first axis being substantially perpendicular to the second axis, the first and second axes being locally substantially 45° from the respective along-track directions of the tracks; and an optical head disposed in proximity to the storage medium and having a width that substantially spans at least two adjacent tracks.

* * * * *

UNITED STATES PATENT AND TRADEMARK OFFICE
CERTIFICATE OF CORRECTION

| | | |
|---|---|---|
| PATENT NO. | : 6,937,421 B2 | |
| APPLICATION NO. | : 10/042132 | |
| DATED | : August 30, 2005 | |
| INVENTOR(S) | : Rubin et al. | |

It is certified that error appears in the above-identified patent and that said Letters Patent is hereby corrected as shown below:

The title page showing the illustrative figure should be deleted to be replaced with the attached title page.

The drawing sheets, consisting of Figs. 1-7, should be deleted to be replaced with the drawing sheets, consisting of Figs. 1-7, as shown on the attached page.

Signed and Sealed this

Fifth Day of August, 2008

JON W. DUDAS
*Director of the United States Patent and Trademark Office*

United States Patent
Rubin et al.

(10) Patent No.: US 6,937,421 B2
(45) Date of Patent: Aug. 30, 2005

(54) PATTERNED MEDIA HAVING OFFSET TRACKS

(75) Inventors: Kurt Alan Rubin, Santa Clara, CA (US); Bruce David Terris, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 340 days.

(21) Appl. No.: 10/042,132

(22) Filed: Jan. 11, 2002

(65) Prior Publication Data

US 2003/0133213 A1 Jul. 17, 2003

(51) Int. Cl.[7] .................................................. G11B 5/58
(52) U.S. Cl. .................. 360/77.01; 360/77.02; 360/77.03; 360/48; 360/75; 360/76
(58) Field of Search ................... 360/77.01–77.02, 360/77.07, 77.11, 77.12, 77.03, 75–76, 48, 55, 59, 135, 131, 134, 78.04, 81, 77.14, 78.14; 369/13.56, 44.11, 47.1, 44.26, 53.34

(56) References Cited

U.S. PATENT DOCUMENTS

| | | | | |
|---|---|---|---|---|
| 3,665,118 A | * | 5/1972 | Cooper, Jr. | 360/23 |
| 4,074,328 A | * | 2/1978 | Hardwick | 360/77.06 |
| 4,623,867 A | * | 11/1986 | Lundquist et al. | 338/32 R |
| 4,704,711 A | * | 11/1987 | Gerard et al. | 369/53.34 |
| 5,055,951 A | * | 10/1991 | Behr | 360/77.12 |
| 5,247,398 A | | 9/1993 | Sidman | 360/75 |
| 5,276,566 A | * | 1/1994 | Clifford, Jr. | 360/64 |
| 5,587,223 A | | 12/1996 | White | |
| 5,820,769 A | | 10/1998 | Chou | |
| 6,233,206 B1 | * | 5/2001 | Hamann et al. | 369/13.01 |
| 6,356,406 B1 | * | 3/2002 | Takano et al. | 360/81 |
| 6,421,195 B1 | * | 7/2002 | Rubin et al. | 360/48 |
| 6,430,123 B1 | * | 8/2002 | Mallary | 369/44.11 |
| 6,500,497 B1 | * | 12/2002 | Wang et al. | 427/528 |

OTHER PUBLICATIONS

M. Todorovic et al., Writing and reading of single magnetic domain per bit perpendicular patterned media, Applied Physics Letters, vol. 74, No. 17, Apr. 26, 1999, pp. 2516–2518.

* cited by examiner

*Primary Examiner*—David Hudspeth
*Assistant Examiner*—Natalia Figueroa
(74) *Attorney, Agent, or Firm*—Banner & Witcoff; Joseph P. Curtin (57) ABSTRACT

An information recording system includes a storage medium, such as a magnetic or an optical medium, that is formed to have a plurality of adjacent tracks. Each track includes a plurality of storage elements that are arranged substantially along the track in a regular manner. A head disposed in proximity to the storage medium and has a width that spans at least two adjacent tracks. The storage elements are further arranged substantially along first and second axes, such that the first and second axes are substantially perpendicular to each other and are each substantially oriented 45° from an along-track direction associated with a track. The head reads and/or writes information from at least two adjacent tracks spanned by the head.

24 Claims, 5 Drawing Sheets